United States Patent
Adams

(10) Patent No.: US 6,957,416 B2
(45) Date of Patent: Oct. 18, 2005

(54) DOCUMENT BUILDER CLASSES AND METHODS

(75) Inventor: John C. Adams, Westminster, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 705 days.

(21) Appl. No.: 09/773,121

(22) Filed: Jan. 31, 2001

(65) Prior Publication Data

US 2002/0104070 A1 Aug. 1, 2002

(51) Int. Cl.$^7$ ................................. G06F 9/44
(52) U.S. Cl. .................. 717/107; 717/100; 717/106; 715/500
(58) Field of Search .................. 715/500; 717/107, 717/106–108, 100

(56) References Cited

U.S. PATENT DOCUMENTS

| | | | | |
|---|---|---|---|---|
| 5,544,302 A | * | 8/1996 | Nguyen | 345/837 |
| 5,708,825 A | * | 1/1998 | Sotomayor | 715/501.1 |
| 5,860,073 A | * | 1/1999 | Ferrel et al. | 715/522 |
| 5,940,834 A | | 8/1999 | Pinard et al. | 707/102 |
| 5,953,526 A | * | 9/1999 | Day et al. | 717/108 |
| 6,003,077 A | | 12/1999 | Bawden et al. | 709/223 |
| 6,035,119 A | * | 3/2000 | Massena et al. | 717/100 |
| 6,208,994 B1 | * | 3/2001 | Abdelnur | 707/103 R |
| 6,476,833 B1 | * | 11/2002 | Moshfeghi | 345/854 |
| 6,584,480 B1 | * | 6/2003 | Ferrel et al. | 715/513 |
| 6,598,035 B2 | * | 7/2003 | Branson et al. | 706/47 |
| 6,651,240 B1 | * | 11/2003 | Yamamoto et al. | 717/108 |
| 6,654,754 B1 | * | 11/2003 | Knauft et al. | 707/100 |
| 6,684,369 B1 | * | 1/2004 | Bernardo et al. | 715/513 |
| 2002/0042831 A1 | * | 4/2002 | Capone et al. | 709/230 |
| 2003/0131338 A1 | * | 7/2003 | Georgalas | 717/104 |

OTHER PUBLICATIONS

Monmarche, N., Nocent, G., Slimane, M., Venturini, G., Santini, PI, "Imagine: a tool for generating HTML style sheets with an interactive genetic algorithm based on genes frequencies", p. 640–645, IEEE 1999, retrieved from IEEE database Dec. 3, 2003.*

Ohtsuki, Mika, Segawa, Jun'ichi, Yoshida, Norihiko, Makinouchi, Akifumi, "Structured Document Framework for Design Pattern based on SGML", p. 320323, IEEE 1997, retrieved from IEEE database Dec. 3, 2003.*

Ozsu, M. Tamer, Iglinski, Paul, Szafron, Duane, El–Medani, Sherine, Jughanns, Manuela, "An Object–oriented SGML/HYTIME Compliant Multimedia Database Management System", Nov. 1997, retrieved from ACM Portal database Dec. 3, 2003.*

* cited by examiner

Primary Examiner—Tuan Dam
Assistant Examiner—Mary Steelman

(57) ABSTRACT

Computer readable media and methods are associated with a software development tool that is useful when authoring programs that generate documents, such as markup language documents. In one respect, the invention is a computer readable medium on which is embedded computer software. The software comprises a base class, an inline class and a container class. The base class defines a parent-child relationship by which a child object is stored within the storage space of its parent object. The inline class is an extension of the base class, wherein a member of the inline class is permitted to be a child object but prohibited from being a parent object. The container class is an extension of the base class, wherein a member of the container class is permitted to be a child object and/or a parent object. A well-formed document can be modeled in software using members of the inline and/or container classes. In another respect, the invention is a method of using the a set of classes to develop a document-producing program. The set of classes comprises the base class, inline class and container class. In yet another respect, the invention is a document-producing program produced by the preceding method.

19 Claims, 8 Drawing Sheets

```
<HTML>
<HEAD>                                          200
<TITLE>OO Objects/Classes/Instances</TITLE>  ⟵ 220
</HEAD>
<BODY>

<P><FONT color="forestgreen" size+"+2" id="arial">
   <B>Understanding Object Orientation Concepts</B>  ⟵ 232
</FONT></P>

<P><FONT color="black">
   <B>Objects & Classes</B>  ⟵ 234
</FONT></P>

<P>The world is full of <I>objects</I>. We naturally think of
objects in hierarchical categories, or <I>classes</I>. For
example, a computer is a general class of object. A hierarchy
of object classes surrounds the class "computer",,
extending in both directions. "Computer" is a
member of the more general class "machines". In  ⟵ 236
the other direction of the hierarchy are specific types of
computers: notebook computers, supercomputers, HP
computers, etc. If you are reading this document on your
computer, you are looking at an <I>instance</I> of the class
"computer".</P>

<P><CENTER>
   <IMG src="computer.gif" border="0">  ⟵ 240
</CENTER></P>
<HR />  ⟵ 250

Mo'OO? Look up another concept:<BR>  ⟵ 238

<TABLE border+"2" width+60%">
<TR>
 <TD>
 <A href="http://www.mooo.org/inh.htm">Inheritance</A>
 <TD>
 <TD>
 <A href="http://www.mooo.org/encap.htm">Encapsulation</A>  ⟵ 270
 </TD>
 <TD>
 <A href="http://www.mooo.org/overld.htm">Overloading</A>
 </TD>
</TR>
</TABLE>

</BODY>
</HTML>
```

```
main ()
{
        htmlDocument*  document = new htmlDocument (stdout,
                                        "OO Objects/Classes/Instances");
310 ⎨   tableGrid*     table    = new tableGrid (1, 0, 0, "60%");
        centered*      center   = new centered ();

document->add( new paragraph () );
332 ⎨   document->add( new htmlText ("Understanding Object Orientation
                       Concepts", "forestgreen", normal, bold, "+2", "arial"));

document->add( new paragraph () );
334 ⎨   document->add( new htmlText ("Objects & Classes", "black",
                                                       normal, bold));

explanation = query(oo_concept_database, concept);
        find_first_and_italicise(explanation_text, "object", "class",
336 ⎨                                                   "instance");
        document->add( new paragraph() );
        document->add( new htmlText(explanation_text) );

document->add( new paragraph() );
340 ⎨   center->add( new image(explanation_image) );
        document->add(center);

350 ⎯ document->add( new horizontalRule() );

338 ⎯ document->add( new htmlText("Mo' OO?  Look up another link:") );

table->newRow();
        table->addField( new anchor("http://www.mooo.com/Inheritance",
                                    new htmlText ("Inheritance") ) );
        table->addField( new anchor("http://www.mooo.com/Encapsulation",
360 ⎨                               new htmlText ("Encapsulation") ) );
        table->addField( new anchor("http://www.mooo.com/Overloading",
                                    new htmlText ("Overloading") ) );
        document->add(table);

delete document;
}
```

```
// This class is an interface for defining the basic HTML/XML
// relationship between a child element and its parent.

class htmlMarkup
{
protected:
        htmlMarkup* parent = NULL;
        FILE*        fptr   = NULL;
public:
        htmlMarkup();
        virtual ~htmlMarkup();
        virtual setParent(htmlMarkup* parent)  ⟵ 510
                { this.parent = parent }
}
```

```
class htmlInline extends htmlMarkup
{
protected:
        DynamicArray* buffer = NULL;
public:
        htmlInline();
        virtual ~htmlInline()
                { if (buffer) fprintf(parent.fptr, "%s", buffer)}  ⟵ 610
}
```

```
class htmlAnchor extends htmlInline
{
public:
                                                                ⟵ 710
        htmlAnchor (String href, htmlMarkup* label)
                { buffer = "<a";
                  buffer += " href="+href;
                  buffer += ">";

// flush the label markup to this buffer
                  label.setParent(this);
                  delete label;
                  buffer += "</a>";
                }
}
```

```
class htmlContainer extends htmlMarkup
{
protected:
        FILE*fptr = NULL;
public:
        htmlContainer();
        virtual ~htmlContainer()
                { if (fptr && parent.fptr)
                        concatencateFiles(fptr, parent.fptr);}
}
```

```
class htmlTable extends htmlContainer
{
public:
        htmlTable()
                { fptr = new temporaryFile();
                  print("<table>");
                } vitrual ~htmlTable ()
                { print("</table>"); } void addRow()
                { print("<tr>");    } void addContent(htmlMarkup* content)
                { print("<td>");

// flush the child content to this table
                          content.setParent(this);
                        delete content;

print("</td>");
                }
}
```

| Class | Style | HTML element |
|---|---|---|
| commentText | htmlInline | <!-- -- > |
| htmlText | htmlInline | ASCII text |
| formattedText | htmlInline | <PRE> |
| embeddedText | htmlInline | <LAYER> |
| htmlImage | htmlInline | <IMG> |
| htmlAnchor | htmlInline | <A> |
| paragraph | htmlInline | <P> |
| centered | htmlContainer | <CENTER> |
| lineBreak | htmlInline | <BR> |
| noLineBreak | htmlInline | <NOBR> |
| horizontalRule | htmlInline | <HR> |
| table | htmlContainer | <TABLE> |
| htmlDocument | htmlContainer | <HTML> |
| htmlForm | htmlContainer | <FORM> |
| formInput | htmlInline | <INPUT> |
| formTextReadOnly | htmlInline | <TEXT> |
| selectionList | htmlContainer | <SELECTION> |

*Fig. 10*

DOCUMENT BUILDER CLASSES AND METHODS

FIELD OF THE INVENTION

This invention relates generally to object oriented computer programming, and more particularly to software tools for programmatically developing documents.

BACKGROUND OF THE INVENTION

FIG. 1 illustrates an exemplary web page 100. The web page 100 is displayed in a browser window 110 having a title bar 120. The web page 100 comprises four text sections 132, 134, 136 and 138, in various styles and formats, a graphic image 140, a horizontal line 150 and a table 160 containing several hyperlinks 170.

FIG. 2 illustrates an HTML (hypertext mark-up language) document 200 corresponding to the web page 100. A browser program generates the web page 100 using the HTML document 200 as input. The basic building blocks of an HTML document are tags. Each tag is sandwiched between angle brackets ("<" and ">"). As an example, the first four tags in the HTML document 200 are "<HTML>," "<HEAD>," "<TITLE>" and "</TITLE>." Tags come in two types: opening tags and closing tags. A Closing tag has a backslash ("/") after the left angle bracket ("<") and is otherwise the same as its matching opening tag. In the HTML document 200, the first example of a matched pair of opening and closing tags are "<TITLE>" and "</TITLE>" on the third line. Between these opening and closing tags is an argument (in this case, "OO Objects/Classes/Instances"), which shows up in the title bar 120 of the browser window 110. The HTML document 200 includes many other examples of matched pairs of opening and closing tags, like "<B>" and "</B>" for bold, "<I>" and "</I>" for italics, "<FONT . . . >" and "</FONT>" for font selection, "<CENTER>" and "</CENTER>" for horizontal centering, and "<TABLE>" and "</TABLE>" for a table. In fact, the entire HTML document 200 spans from the opening tag "<HTML>" to the closing tag "</HTML>." Not all opening tags have a closing tag. Examples include "<BR>" for a line break, "<IMG>" for an image, "<HR>" for a horizontal rule or line, and "<-->" for comments.

Note that the HTML document 200 is illustrated in FIG. 2 as having uppercase tags. One may choose to use lowercase tags instead. In fact, XHTML (extensible HTML) requires that tags be in lowercase. XHTML also requires that an opening tag for which there is no closing tag be in the form "<TAG/>."

Sections of the HTML document 200 are labeled with reference numbers having the same last two digits as reference numbers used to label corresponding parts of the web page 100. For example, the HTML title section 220 gives the web page its title in the title bar 120. The HTML section 232 produces the top text section 132 ("Understanding Object Orientation Concepts") in an arial font, in an augmented size and in a particular color. The HTML section 234 produces the next line of text 134 in a bold format. The HTML section 236 produces the next paragraph of text 136, including several italicized words. The HTML section 238 produces the text section 138. The HTML section 240 produces the graphic image 140, centered horizontally on the web page 100, by referencing a graphics file (.gif). The HTML statement 250 produces the horizontal line 150. The HTML table section 260 produces the table 160, having three entries in a row. Each entry is a hyperlink 170, produced by the anchor statements 270 in the HTML document 200. The HTML document 200 may also contain comments (not shown) that do not appear in the browser window 110.

The conceptually simplest method for creating a markup language document is to type it manually using a text editor or word processor. However, manual preparation of documents is extremely labor intensive. Furthermore, manual preparation of documents is error prone. Even if additional labor is expended checking the document for errors or poor style, malformed documents can (and do) still result. Common errors are omission of required closing tags and having closing tags in the wrong order. Examples of poor style include not enclosing values in quotations (e.g., "arial," "+2" or "red" in the font tag in the HTML section 232), typing special characters directly rather than their escape code (e.g., "&") in the HTML section 234 is the escape code for the ampersand character ("&"), and inadequate commenting. Errors and/or poor style in an HTML document can produce unpredictable results on different browsers.

Good practice demands that manually prepared HTML documents be validated. Although there exist HTML validation programs that can read an HTML file and report any errors or poor style, use of such validation programs requires extra time and effort. Furthermore, case by case validation processes are neither scalable nor extensible. As a result, it is difficult to generate a large number of consistent documents manually.

There are tools available to automate, to some degree, the generation of web pages. These tools are programs whose output is a markup language document. Examples of these tools are HTML editors and the automatic web page generator disclosed in U.S. Pat. No. 5,940,834. Page-based HTML editors typically present a browser view of a web page on which a user can enter and graphically manipulate items. Code-based HTML editors are essentially text editors enhanced with pull down menus, dialog boxes, shortcuts or other commands for entering tags in a quicker or more user friendly manner. Though simplifying HTML document creation for some authors, HTML editors fall short of providing complete automation and are not perfectly suited for high volume production.

The automatic web page generator disclosed in U.S. Pat. No. 5,940,834 is a software program that presents a user with menus by which the user can add, delete or modify information about individuals in an organization (e.g., employees in a company). The output of the software program are HTML documents that produce a web-based personnel directory (e.g., employee telephone directory). Authoring software such as that software program (or an HTML editor) is a time-consuming endeavor that requires specialized skills and knowledge of markup languages. Like any good software, HTML generating programs ideally produce error-free and easy to read output, are extensible, scalable, robust, have intuitive appeal and are themselves easy to read. Such an ideal is difficult to achieve.

SUMMARY OF THE INVENTION

The invention is computer readable media and methods associated with a software development tool that is useful when authoring programs that generate documents, such as markup language documents.

In one respect, the invention is a computer readable medium on which is embedded computer software. The software comprises a base class, an inline class and a container class. The base class defines a parent-child relationship by which a child object is stored within the storage space of its parent object. The inline class is an extension of the base class, wherein a member of the inline class is permitted to be a child object but prohibited from being a parent object. The container class is an extension of the base class, wherein a member of the container class is permitted to be a child object and/or a parent object. A well-formed document can be modeled in software using members of the inline and/or container classes.

In another respect, the invention is a method of using the a set of classes to develop a document-producing program. The set of classes comprises the base class, inline class and container class.

In yet another respect, the invention is a document-producing program produced by the preceding method.

In comparison to known prior art, certain embodiments of the invention are capable of achieving certain advantages, including some or all of the following: (1) documents, such as markup language documents, can be programmatically generated, allowing improved development of automatic web page generators, for example; (2) the solution is scalable, reusable, extensible and flexible; and (3) the occurrences of malformed documents can be controlled or eliminated. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

FIG. 2 illustrates an HTML document that produces the web page of FIG. 1;

FIG. 3 illustrates a program, according to an embodiment of the invention, that produces as output the HTML document of FIG. 2;

FIGS. 5–9 illustrate pseudocode of various classes, according to an embodiment of the invention;

FIG. 10 is a table of function call usage parameters and their corresponding returned values, according to an embodiment of the invention.

DETAILED DESCRIPTION OF A PREFERRED EMBODIMENT

Figure 1:
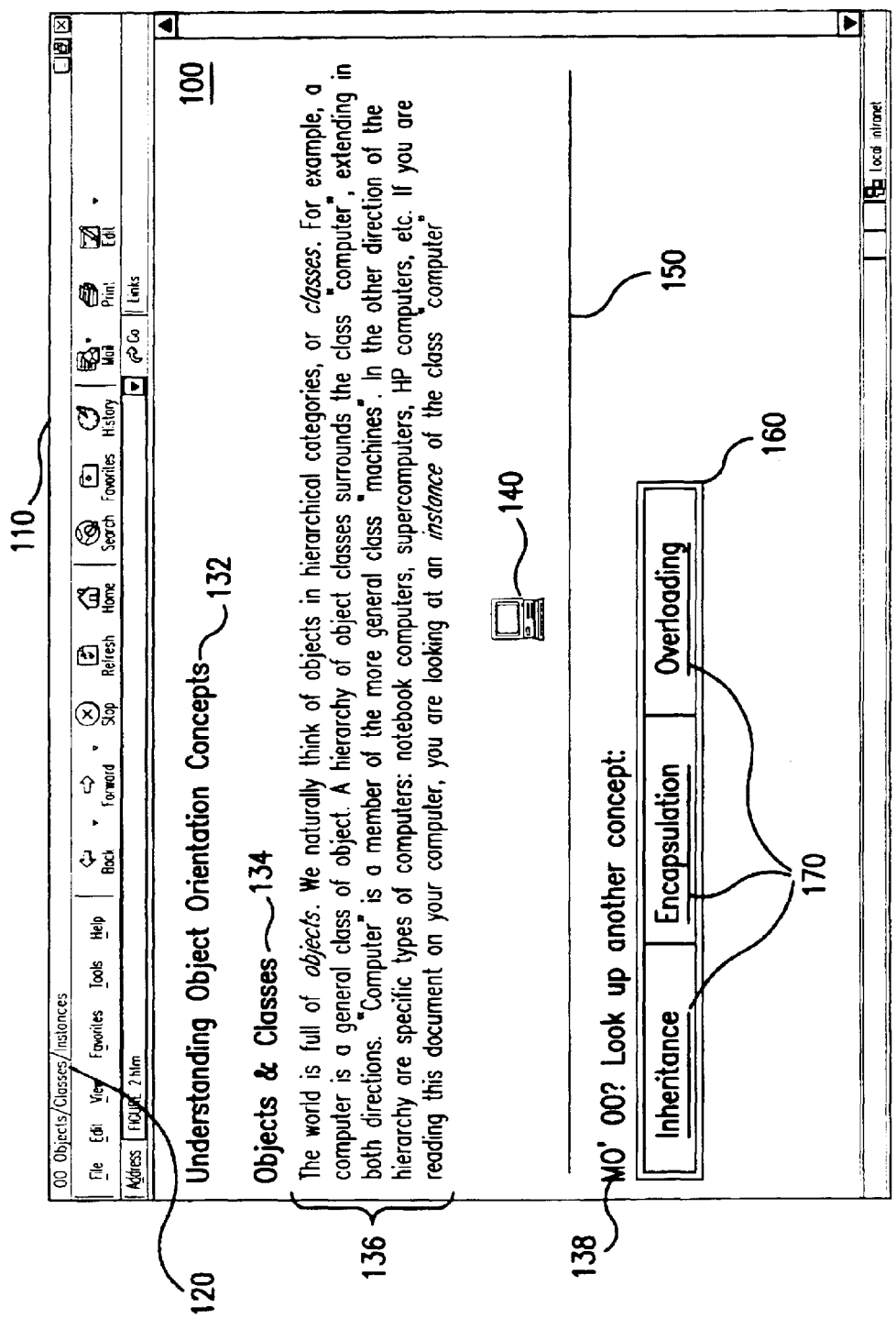
FIG. 1 illustrates an exemplary web page.

FIG. 3 illustrates a program 300, according to an embodiment of the invention, that produces as output the HTML document 200. In other words, the program 300 is an HTML generator (also called a "web page generator"). The program 300 utilizes certain object oriented classes that are described in greater detail in FIGS. 4–10. For now, the program 300 will be described generally. The reader will better appreciate the program 300 in greater depth after reading the detailed descriptions of FIGS. 4–10.

The program 300 is a C++ main program. The program 300 includes a variable declaration section 310. The variable "document" is a data structure that ultimately contains the HTML formatted document, the output product of the program 300. Code sections of the program 300 are labeled with reference numbers having the same last two digits as reference numbers used to label corresponding sections of the HTML document and corresponding parts of the web page 100. The code section 332 adds the HTML section (producing the text "Understanding Object Orientation Concepts") to the document. The code sections 334, 336 and 338 illustrate alternative techniques for adding text-producing HTML to the document, particularly the HTML sections 234, 236 and 238. The code section 336 calls a function (not shown) to query a database. This function returns a data structure that includes the text 136 and the graphics image 140. The code section 336 next calls another function to find the first occurrences of words beginning with "object," "class" and "instance" and to insert "<I>before and "</I>" after those instances. The code line 340 adds the HTML section 240, which produces the graphic image 140. The code line 350 adds the HTML tag 250 ("<HR>") that produces the horizontal line 150. The code section 360 adds the HTML section 260 that produces the table 160, which has three entries in one row. The code lines 370 add the HTML anchor commands 270 to the table, so as to produce the hyperlinks 170.

The program 300 is an intuitive way to programmatically generate the HTML document 200. The program 300, the HTML document 200 and the web page 100 are simple examples, but a programmer skilled in the art can readily appreciate that, in the same manner, very complex documents can be built using simple, easily understandable code. The power of this approach is due in part to the object classes on which the approach is based. Those object classes will now be described in greater detail, with reference to FIGS. 4–10.

Figure 4:
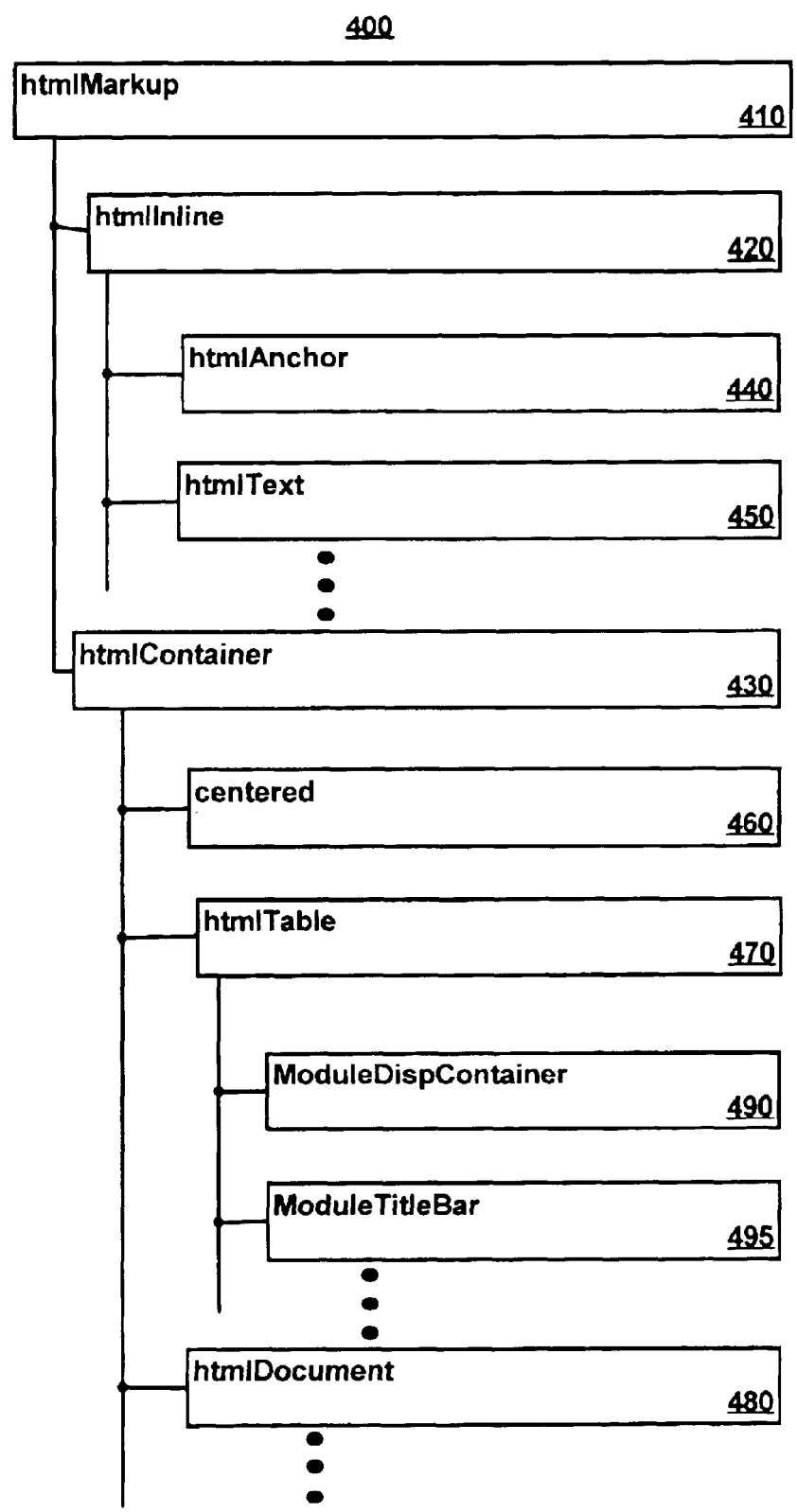
FIG. 4 is a class hierarchy diagram, according to an embodiment of the invention.

FIG. 4 depicts a class hierarchy 400, that illustrates the relationships among the various classes that are utilized, directly or indirectly, by the program 300. The classes exist in four layers, each layer depicted at a different indent in FIG. 4. Together, these classes are referred to herein as "HTML builder classes." At the root or foundation layer is the single class htmlMarkup 410. This class serves as a specification and defines the basic internal relationships for the lower level classes. The htmlMarkup class 410 defines a rule for associating a child element with a parent container element. This rule is discussed in greater detail below. Under the htmlMarkup class 410 are two classes: htmlInlline 420 and htmlContainer 430, which are explained in detail below. Under these two classes are various extensions. For example, an anchor class 440 and an htmlText class 450 are extensions of the htmlInline class 420; a centered class 460, a table class 470 and an htmlDocument class 480 are extensions of the htmlContainer class 430. Optionally, higher abstraction classes are possible, such as a Module-DispContainer class 490 and a ModuleTitleBaar class 495, both of which are extensions of the table class 470.

The htmlMarkup class 410 defines a parent-child relationship. Once this relationship is established between a child object and its parent object, the contents of the child data structure are moved from the child's storage into the parent's storage. Alternatively, the data could be copied, rather than moved, but that complicates memory management. Moving of the data is preferred, because doing so aids the developer (who uses the HTML builder classes) in proper memory management. The manner in which the data is stored is arbitrary.

The htmlContainer class 420 and the htmlInline class 430 are designed to model two basic types of HTML elements, each being optimized differently for their inherently different uses. The htmlContainer class 420 is permitted to be a parent, but the htmlInline class 430 is not. The htmlContainer class, therefore, can model HTML elements in which other HTML elements can be nested. Such HTML elements are herein termed "container" elements. The htmlInline class 430, on the other hand, best models HTML elements in which other HTML elements cannot be or typically are not nested. Such HTML elements are herein termed "inline" elements. Container elements always have opening and closing tags, whereas inline elements sometimes have only an opening tag. As a quick example, the entire HTML document 200 is an "HTML" container element (spanning from the opening tag "<HTML>" to the closing tag "</HTML>") containing many other elements.

Because a container element can contain any number of child elements, the htmlContainer class 420 preferably utilizes temporary files to store its information. Temporary storage is provided because it is often advantageous to allow the document generation program to construct parts of a document in tandem separately and then associate the parts as children to parents in a later step. Performance is improved by limiting the use of temporary files until needed and by limiting the amount of virtual memory required to house a document. Quite differently, an inline element cannot contain anything; therefore, storage for the htmlInline class 430 is fixed to the class itself and preferably provided in virtual memory, which can be accessed more quickly. Performance if further improved by allowing child objects of either class to use their parent's storage if and when it becomes available.

FIGS. 5–9 illustrate pseudocode of various classes, according to an embodiment of the invention. FIG. 5 illustrates pseudocode of the htmlMarkup class 410. The htmlMarkup class 410 includes a setParent function 510, that that is used to establish a relationship between a child object and its parent. FIG. 6 illustrates pseudocode of the htmlInline class 420 and includes a destructor 610 that outputs a data structure "buffer," which is the basic data structure resident in virtual memory for inline HTML elements. FIG. 7 illustrates pseudocode of the htmlAnchor class 440, which, in one embodiment, is a child of the htmlInline class 420. The htmlAnchor class 440 is invoked by the code lines 370 of the program 300. As can be seen, a constructor function ("htmlAnchor") 710 constructs an HTML anchor tag ("<A . . . >") using the parameters passed in to the function. As an extension to the htmlInline class 420, the htmlAnchor class 440 utilizes the "buffer" data structure.

As an alternative, the htmlAnchor class 440 could be implemented as a container class. However, an anchor element only contains a very restricted number of element types, primarily text and images. By making the htmlAnchor class 440 inline, the builder classes are simpler in their programmatic interfaces and easier for developers to use and use correctly.

FIG. 8 illustrates pseudocode of the htmlContainer class 430. The htmlContainer class 430 includes a destructor 810 that concatenates a child and parent. Thus, the parent "contains" the child. FIG. 9 illustrates pseudocode of the htmlTable class 450. As can be seen, the htmlTable class 450 includes a constructor 910 that outputs a table start tag ("<TABLE>"). The htmlTable class 450 also includes a destructor 920 that outputs a table end tag ("</TABLE>"). The htmlTable class 450 includes an addRow function 930 that outputs the tag "<TR>" and an addContent function 940 that outputs content for one table cell (column previously added row), as determined by input parameters, sandwiched between the tags "<TD>" and "</TD>."

The pseudocode in FIGS. 7 and 9 are representative of how the htmlInline class 420 and the htmlContainer class 430, respectively, can be extended to model HTML elements. One skilled in the art of object oriented programming can appreciate how other HTML elements could similarly be modeled. A table 1000 listing other extension classes for various other HTML elements is shown in FIG. 10. Generally, each class provides a constructor that defines the HTML element and allows the caller to set any of its attributes. For example, the htmlImage class allows the caller to set the attributes src (source filename), alt, border, width, height, id, class and style. A constructor of the inline type generally outputs to a data structure "buffer" the required opening tag, any attribute settings and closing tag, if necessary. With the container type, a constructor generally outputs to a temporary file just the opening tag and a destructor generally outputs the closing tag to the temporary file. The table 1000 is not exhaustive. All of the possible attributes for all possible HTML elements can be found in references common to those skilled in HTML.

The extension classes listed in the table 1000, and similar ones not shown, can themselves be extended to provide more specific types of HTML elements. For example, a particular style of table can be modeled as an extension of the htmlTable class 470. In this way, the first three layers of HTML builder classes provide extensible way to build even more powerful document building tools. In essence, the advantages of object orientation (e.g., modularity, reusability, testability, supportability) are brought to bear on document building.

Figure 11:
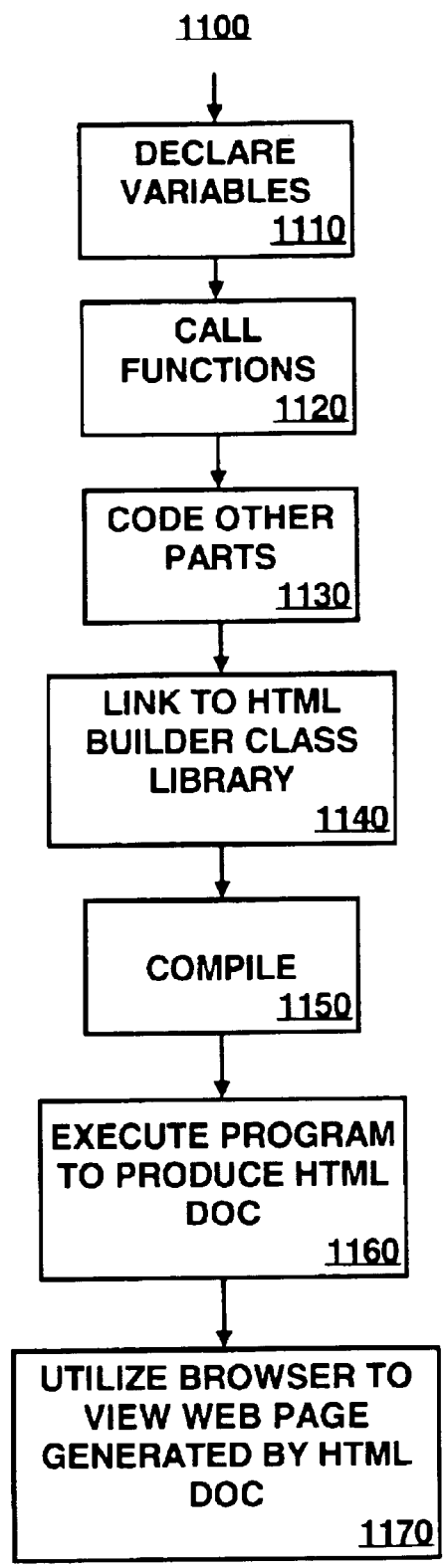
FIG. 11 is a flowchart of a method of using the software, according to an embodiment of the invention.

FIG. 11 is a flowchart of a method 1100 of using the HTML builder classes, according to an embodiment of the invention. The first three steps of the method 1100 involve coding a source code program. First, a programmer declares (1110) one or more variables of the types defined by the HTML builder classes and/or extensions thereof. Next, the programmer calls (1120) functions defined by the HTML builder classes and/or extensions thereof. Finally, the programmer codes (1130) other parts of the program source code. The variable declaration step 1110, the function calling step 1120 and the other coding step 1130 may be performed in any order, according to the preference of the programmer. The resulting source code program may be in any object oriented language, such as C++, for example. After coding the source code program, the programmer links (1140) the source code to a library in which is packaged source code of the HTML builder classes. Next, the linked code is compiled (1150) to produce an executable program. The program that is the product of the coding steps 1110–1130 is a document-producing program in source code form. The program that is the product of the compilation step 1150 is a document-producing program in executable form. Execution (1160) of the document-producing program generates an HTML document. In fact, execution (1160) of the document-producing program under different input conditions results in various HTML documents. Finally, a web browser can be utilized (1170) to view the web page produced by the HTML document.

The HTML builder classes, their extensions, and a document-producing program that utilizes the HTML builder classes and/or their extensions can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the HTML builder classes, their extensions or document-producing programs on a CD ROM or via Internet download. In a sense, the Internet itself, as an abstract entity, is a computer readable medium. The same is true of computer networks in general.

Although an embodiment of the invention has been described above with reference to HTML, the invention is applicable to documents of other markup languages. For example, the HTML document 200 could just as easily be an XHTML, XML (extensible markup language) or SGML (standardized generalized markup language) document. Even more generally, the document could be in any format, such as, for example, a word processing file. For example, a WORDPERFECT (TM) file has "codes" that are similar to tags in that some codes come in opening-closing pairs that can contain other codes or text. The invention contemplates all such documents.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A computer readable medium on which is embedded computer software that programmatically generates a markup language document having at least one markup language element, the software comprising:
   a plurality of code sections each automatically adding to the markup language document a corresponding markup language element, wherein each code section utilizes one of the following object-oriented classes each of which models a type of markup language element:
      an inline class that models a first type of markup language element in which other markup language elements cannot be nested, and which comprises an opening tag, an argument and no closing tag; and
      a container class that models a second type of markup language element in which other markup language elements can be nested, and which comprises an opening tag, a closing tag and an argument disposed between the opening and closing tags.

2. The computer readable medium of claim 1, wherein the object-oriented classes further comprise a base class defining a parent-child relationship by which a child object is stored within storage space of the child's parent object,
   wherein the inline class is an extension of the base class, wherein each object of the inline class is permitted to be a child object and prohibited from being a parent object; and
   wherein the container class is an extension of the base class, wherein each object of the container class is permitted to be either a child object or a parent object,
   wherein the type of markup language element modeled by an object depends on the parent-child relationship defined for the class which the object is a member.

3. The computer readable medium of claim 1, wherein the markup language is selected from group consisting of HTML; XML; XHTML; and SGML.

4. The computer readable medium of claim 1, wherein the software further comprises:
   at least one class that is an extension of the inline class and which, when processed by a browser, produces a corresponding section of a web page comprising a first type of document item.

5. The computer readable medium of claim 4, wherein the first type document item is selected from a group consisting of comment text; formatted text; embedded text; an image; an anchor; a paragraph marker; a line break; and a horizontal rule.

6. The computer readable medium of claim 4, wherein the second type document item is selected from a group consisting of a bold text item; a horizontally centered item; a table; a subdocument; and a selection list.

7. The computer readable medium of claim 1, wherein the software further comprises:
   at least one class that is an extension of the container class and which, when processed by a browser, produces a corresponding section of a web page comprising a second type of document item.

8. The computer readable medium of claim 1, wherein the software includes a variable declaration section in which is declared a variable defining a data structure that ultimately contains the markup language document.

9. The computer readable medium of claim 1, wherein the members of the container class each utilize temporary files to store its information.

10. The computer readable medium of claim 1, wherein the software further comprises:
    a class that is an extension of the inline class and which utilizes a buffer data structure.

11. The computer readable medium of claim 1, wherein child objects of the inline class and the container class can use their parent's storage when it is available.

12. A method for providing executable software program for automatically generating a mark-up language document, comprising:
    developing a program source code on a computer readable medium comprising a plurality of code sections each automatically adding to the markup language document a corresponding markup language element, wherein the markup language elements comprise:
       a first type of markup language element in which other markup language elements cannot be nested and which comprises an opening tag, an argument and no closing tag; and
       a second type of markup language element in which other markup language elements can be nested and which comprises an opening tag, a closing tag and an argument disposed between the opening and closing tags;
    linking the source code to a library in which is packaged source code of the object-oriented classes each of which models either the first type or the second type of markup language element; and
    compiling the linked code to produce the executable software program that, when executed, processes a first set of input conditions to automatically generate the markup language document.

13. The method of claim 12, wherein developing a program source code comprises:
- providing a set of classes each of which models a type of markup language element, comprising:
  - an inline class that models the first type of markup language element; and
  - a container class that models the second type of markup language element;
- declaring one or more variables of the types defined by the classes or extensions thereof;
- calling any functions defined by the classes and extensions thereof; and
- coding other parts of the program source code as necessary.

14. The method of claim 13, wherein the classes further comprise:
- a base class defining a parent-child relationship by which a child object is stored within the storage space of the child's parent object,
- wherein the inline class is an extension of the base class, wherein each object of the inline class is permitted to be a child object and prohibited from being a parent object; and
- wherein the container class is an extension of the base class, wherein each object of the container class is permitted to be either a child object or a parent object, wherein the type of markup language element modeled by an object depends on the parent-child relationship defined for the class of which the object is a member.

15. The method of claim 14, wherein the classes further comprises:
- at least one class that is an extension of the inline class and which, when processed by a browser, produces a corresponding section of a web page comprising a first document item.

16. The method of claim 15, wherein the first document item is selected from a group consisting of comment text, formatted text, embedded text, an image, an anchor, a paragraph marker, a line break and a horizontal rule.

17. The method of claim 15, wherein the classes further comprises:
- at least one class that is an extension of the container class and which, when processed by a browser, produces a corresponding section of a web page comprising a second document item.

18. The method of claim 17, wherein the second document item is selected from a group consisting of a bold text item, a horizontally centered item, a table, a subdocument and a selection list.

19. The method of claim 12, wherein the markup language is selected from a group consisting of HTML; XML; XHTML; and SGML.

* * * * *